April 11, 1944. A. PECHUKAS 2,346,604
METHOD OF RECOVERING STANNIC CHLORIDE
Filed April 9, 1942
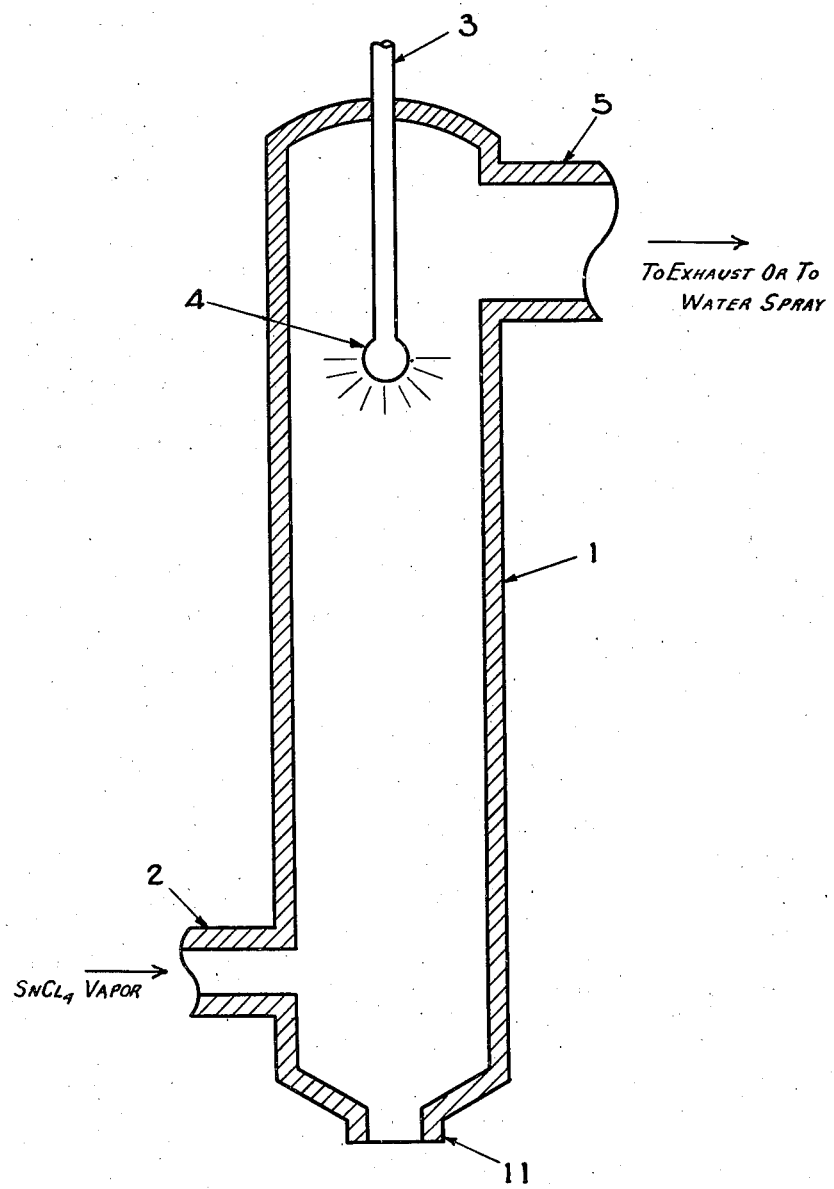
INVENTOR.
ALPHONSE PECHUKAS
BY Patented Apr. 11, 1944

2,346,604

UNITED STATES PATENT OFFICE 2,346,604

METHOD OF RECOVERING STANNIC CHLORIDE

Alphonse Pechukas, Akron, Ohio, assignor to Pittsburgh Plate Glass Company, Pittsburgh, Pa., a corporation of Pennsylvania Application April 9, 1942, Serial No. 438,291

12 Claims. (Cl. 75—111)

This invention relates to a method of recovering a tin tetrahalide such as stannic chloride from vapor mixtures containing the same. In the preparation of stannic chloride, it is the usual practice to chlorinate a tin bearing residue such as stannic oxide, tin scrap, or tin ore at an elevated temperature, whereby stannic chloride is formed and volatilized. This stannic chloride is then condensed and recovered. In the condensation of the stannic chloride, however, it is often difficult to condense the halide completely and often a large portion of the tin values are lost in the exhaust gases.

The chlorination of tin oxide bearing materials such as tin ores often is conducted in the presence of carbon or similar reducing agent. In consequence, a substantial quantity of carbon dioxide and/or carbon monoxide, and in some cases chlorides or oxides of sulphur are present in the gases containing the stannic chloride vapor. In addition, chlorine diluted with various gases such as nitrogen, air, carbon dioxide, etc., may be used in the chlorination, thus resulting in a substantial increase in the amount of diluent gases mixed with the stannic chloride vapor. In consequence, the content of stannic chloride in the gases may be below 90 percent by volume and in many cases the gas from which the tetrachloride must be recovered contains less than 50 percent by volume of stannic chloride.

In accordance with my invention, I have found that a substantially complete removal of stannic chloride may be obtained from the gases containing the same, such as those which result from the chlorination of tin bearing materials. Thus, the gases containing vaporized stannic chloride may be cooled to a suitable temperature, for example, below about 20° C., and preferably not substantially above minus 10° C. by subjecting them to the action of a spray of a stable cold liquid halide, preferably stannic chloride. This treatment permits a condensation of the tetrachloride from the mixture and is found to remove the major portion, generally in excess of 95 percent of the tetrachloride from the gases.

The invention will be more fully understood by reference to the following description illustrated by the accompanying drawing which is a diagrammatic sectional view of a method of treatment in accordance with my invention. In accordance with the method illustrated by the drawing, gases containing tin tetrachloride vapor are introduced into spray chamber 1, through inlet 2, and pass upwardly through the chamber, being bathed in a spray of liquid tin tetrachloride (stannic chloride) which is supplied to the chamber by conduit 3, which discharges through sprayhead 4. The temperature of the liquid tetrachloride is maintained sufficiently low to permit effective condensation, for example, below about 20° C. and preferably, not substantially above minus 10° C. In this manner, a large portion of the vaporized tetrachloride is condensed and collected at the base of the chamber where it is withdrawn through outlet 11. The uncondensed gases which may contain a small amount of uncondensed stannic chloride are withdrawn through conduit 5, and if desired, they may be washed with water in a similar column to hydrolyze or dissolve stannic chloride and complete the recovery. In many cases, however, this washing is unnecessary and the gases discharged at outlet 5 may be vented directly to the atmosphere.

The stannic chloride vapors to be treated may be prepared by any convenient process. In accordance with one suitable modification, it is found desirable to prepare the tin chloride by a suitable chlorination process, such as is described in application for United States Letters Patent Serial No. 371,977, filed December 27, 1940, by Irving E. Muskat, now Patent No. 2,311,466, dated February 16, 1943. In accordance with the process described therein, a tin oxide or sulphide ore or similar tin iron ore is chlorinated in the presence of 2 to 20 percent of carbon at a temperature above 600° C. and preferably at 850 to 1250° C. This results in the production of a gaseous mixture containing vaporized iron and tin chlorides.

The vapors containing iron chloride and tin tetrachloride may be cooled to a convenient temperature below the temperature at which ferric chloride vaporizes. In the event that it is desired to avoid condensation of stannic chloride with the iron chloride, the vapor temperature should be held above the dew point of tin tetrachloride, for example, about 75° C. However, in many cases it is found advantageous to condense a quantity, generally not less than about 20 to 30 percent of the tin tetrachloride with the iron chloride and in such a case the vapor temperature will be maintained at or below the vaporization point of tin tetrachloride. By this means a large portion of the condensed iron chloride is precipitated and removed from the gases. The condensed product is then heated to revaporize the condensed stannic chloride. Such a process has been described in an application for United States Letters Patent Serial No. 383,578, filed March 15, 1941, by Irving E. Muskat and Robert H. Taylor, now Patent No. 2,316,275, dated April 13, 1943.

The uncondensed gases thus obtained contain stannic chloride vapor together with more or less diluent gases such as carbon dioxide, carbon monoxide, chlorine, nitrogen, etc. Often it may contain more or less solid iron chloride or other solid material suspended therein. If present, such materials often tend to plug the condensing system. As described in my copending application for United States Letters Patent Serial No. 383,577, filed March 15, 1941, it has been found that by washing the gaseous mixture with liquid tin tetrachloride, the major portion of the suspended iron chloride is removed and the residual vapor may be conducted to another portion of the condenser and cooled to condense tin tetrachloride without fear of plugging the apparatus.

The gaseous mixture containing carbon dioxide and/or carbon monoxide, and chlorine and stannic chloride thereafter is treated to recover the tin tetrachloride in accordance with the present invention. While tin tetrachloride is especially effective for washing the vapors as herein contemplated, various other liquid halides, metallic or organic, such as tin tetrafluoride, or tetrabromide, silicon or titanium tetrachloride or carbon tetrachloride, or liquid mixtures containing these halides may be used. Use of tin tetrachloride for this purpose, however, is particularly desirable since separation of the condensed tin tetrahalide from the halide used for the washing or condensation is rendered unnecessary. Thus, a portion of the condensed tin tetrachloride may be withdrawn from the base of the spray chamber, cooled, if necessary, and recycled to the sprays. In order to effect an efficient recovery of the tin tetrachloride it is preferred to maintain the temperature of the sprayed terachloride below about 20° C. and preferably not in excess of about minus 10° C.

It will be apparent that during the upward passage of the gases a large portion of the tin tetrachloride is condensed. The cold liquid tetrachloride falls to the bottom of the column bathing the gases in the lower portion of the column and assisting in their condensation. This permits operation without requirement of excessive amounts of previously cooled tin tetrachloride. Thus, the step of washing the vapors may be conducted without introduction of a large quantity of liquid tin tetrachloride by introducing tin tetrachloride cooled to approximately −20° C. at the top of the tower, and allowing countercurrent heat transfer to occur between the downwardly flowing tin tetrachloride and the ascending stannic chloride-containing gas.

The gases after removal from tin tetrachloride spray chamber may contain a small amount of tin tetrachloride which may be removed by treating the gases with a spray of water. In such a case the gas may be passed through a second tower identical to that illustrated in the drawing and the water or aqueous solution of stannic chloride introduced used as the washing medium. In order to prevent hydrolysis of the tetrachloride in the spray chamber, it is often desirable to utilize an aqueous solution of the tetrachloride of sufficient strength to keep the tetrachloride in solution and to maintain the temperature of the solution below the temperature at which the solution hydrolyzes to precipitate stannic hydroxide. Thus, a solution having a concentration of 6 to 20 percent of $SnCl_4$ may be used for this purpose. This solution may be recycled and portions withdrawn and treated to recover the tin therein.

The following example is illustrative:

Using a furnace having an internal diameter of 15 inches which was preheated to a temperature of 1000° C., briquettes prepared from a mixture containing 100 parts ore, 12 parts carbon, and 14 parts molasses, were introduced at a rate of 120 pounds per hour and chlorine at 1.5 to 2.0 pounds per minute. The temperature of the reaction zone was maintained at 850 to 1150° C. by the heat evolved from the reaction and a gaseous mixture of iron and tin chlorides was produced.

The gaseous mixture containing iron chloride and tin tetrachloride was cooled to 135° C. and the iron chloride condensed and was removed by washing the gas with liquid tin tetrachloride. Thereafter, the gases were cooled to 0° C. by washing with a spray of liquid tin tetrachloride which had been previously cooled to minus 10° C. and in excess of 98 percent of the tin tetrachloride was condensed and recovered. The exhaust gases were then sprayed with an aqueous solution containing 15 percent $SnCl_4$ at a temperature of 10 to 20° C. and substantially all of the tin tetrachloride in the gases was recovered.

While the invention has been described with particular reference to tin tetrachloride, it is apparent that the process may be applied to the recovery of tin tetrafluoride, tetrabromide, or tetraiodide, in a similar manner.

Although the present invention has been described with particular reference to the specific details of certain embodiments thereof, it is not intended that such details shall be regarded as limitations upon the scope of the invention except insofar as included in the accompanying claims. This application is a continuation-in-part of my copending application Serial No. 383,577, filed March 15, 1941.

I claim:

1. The method of condensing stannic chloride from a vaporized mixture produced by the chlorination of a tin bearing material which comprises washing the mixture with substantially anhydrous, liquid stannic chloride having a temperature below about 20° C. and subsequently washing the uncondensed vapors with an aqueous medium.

2. The method of condensing stannic chloride from a vaporized mixture produced by the chlorination of a tin bearing material which comprises washing the mixture with substantially anhydrous stannic chloride having a temperature below about 20° C. and subsequently washing the uncondensed vapors with an aqueous solution of stannic chloride.

3. The method of condensing stannic chloride from a vaporized mixture which comprises washing the mixture with liquid substantially anhydrous halide having a temperature below about 20° C.

4. The method of condensing stannic chloride from a vaporized mixture which comprises washing the mixture with substantially anhydrous stannic chloride having a temperature not in excess of about 20° C.

5. The method of condensing stannic chloride from a vaporized mixture which comprises washing the mixture with substantially anhydrous stannic chloride having a temperature below about 0° C.

6. The method of condensing stannic chloride from a vaporized mixture which comprises washing the mixture with a substantially anhydrous liquid medium containing substantially anhydrous stannic chloride having a temperature below about 20° C.

7. The method of condensing stannic chloride from a vaporized mixture which comprises washing the mixture with a substantially anhydrous liquid medium comprising a substantially anhydrous liquid halide having a temperature below about 20° C.

8. A method of preparing liquid stannic chloride which comprises chlorinating a tin bearing ore in the presence of a carbonaceous material whereby to form a vaporized mixture containing stannic chloride and a gaseous oxide of carbon and washing the vaporized stannic chloride with substantially anhydrous liquid stannic chloride having a temperature not in excess of about 30° C.

9. A method of preparing liquid stannic chloride which comprises chlorinating a tin bearing ore in the presence of a carbonaceous material whereby to form a vaporized mixture containing stannic chloride and a gaseous oxide of carbon and washing the vaporized stannic chloride with substantially anhydrous liquid stannic chloride having a temperature not in excess of about 0° C.

10. A method of preparing liquid stannic chloride which comprises chlorinating a tin bearing ore in the presence of a carbonaceous material whereby to form a vaporized mixture containing iron chloride, stannic chloride, and a gaseous oxide of carbon, condensing and removing iron chloride from the mixture and washing the vaporized stannic chloride with substantially anhydrous liquid stannic chloride having a temperature not in excess of about 30° C.

11. A method of preparing liquid stannic chloride which comprises chlorinating a tin bearing ore in the presence of a carbonaceous material whereby to form a vaporized mixture containing iron chloride, stannic chloride, and a gaseous oxide of carbon, condensing the iron chloride, washing the iron chloride from the vaporized stannic chloride with a liquid halide, and washing the vaporized stannic chloride with substantially anhydrous liquid stannic chloride having a temperature not in excess of about 0° C.

12. A method of condensing stannic chloride from a vaporized mixture containing less than 50 percent by volume of stannic chloride and diluent gases which comprises washing the mixture with substantially anhydrous, liquid stannic chloride having a temperature below about 20° C.

ALPHONSE PECHUKAS.